May 2, 1961 T. R. SCOTHORN 2,982,863

PHOTOELECTRIC SENDER AND RECEIVER

Filed Sept. 2, 1958

INVENTOR.
THOMAS R. SCOTHORN
BY
Smith, Wilson, Lewis & McRae
ATTORNEYS 2,982,863
Patented May 2, 1961

2,982,863

PHOTOELECTRIC SENDER AND RECEIVER

Thomas R. Scothorn, Belleville, Mich., assignor to Industrial Electronics, Inc., Detroit, Mich., a corporation of Michigan Filed Sept. 2, 1958, Ser. No. 758,485

7 Claims. (Cl. 250—239)

This invention relates to a photoelectric control unit, and more particularly to an improved sending unit having a light source which may be readily adjusted rotationally and longitudinally relative to a receiving unit of improved design whereby greater accuracy of control is achieved.

In the operation of photoelectric units a narrow light beam is directed by a sending unit, across the path where the units or devices being monitored must pass, to a receiving unit. The light beam passing from the sending to the receiving unit activates light-sensitive material in the receiving unit, and an electrical circuit to a control unit is completed. When this light beam is broken or cut off the electrical circuit to the control unit is interrupted, and the interruption or the re-establishment of this electrical circuit in the control unit can be employed to activate a device to perform a desired operation.

Photoelectric units are employed to control all types of actuators, such for example as to control the opening of doors; to control the operation of belts used to convey groceries at check-out stations of supermarkets; the counting of articles in manufacturing operations or elsewhere, and for many other purposes.

Photoelectric units are frequently subjected to impact which misaligns the sending and receiving units, thus causing misalignment of the light beam flowing from the sending unit to the receiving unit used to actuate the device. The receiving units are on occasion subjected to stray light beams which cause them to function to maintain or re-establish the electrical circuit in the control unit. Malfunctioning of the device is thus encountered.

The space available for mounting photoelectric units is frequently limited, and it has therefore been difficult to provide a secure mounting where the unit would not be subjected to undesirable shock and vibrational stresses. Devices heretofore used, particularly the light source units, have been difficult to maintain in suitable adjusted relation.

An object of my invention is therefore to provide an improved photoelectric control device having light source and light receiving units of improved design which may be more readily adjusted than has heretofore been possible.

Another object of my invention is to provide an improved photoelectric sending unit formed of round bar stock and having an eccentric bore to receive a light emitting unit, the bar being clampingly engaged for longitudinal and rotational adjustment.

A further object of my invention resides in the provision of an improved readily adjustable photoelectric sending unit whereby the direction of light emanating from the unit may readily be adjusted angularly and longitudinally to align with the receiving unit.

Still a further object of my invention is to provide an improved photoelectric light receiving unit having an elongated narrow channel member whereby stray light beams are screened out and prevented from impinging on the light-sensitive unit to provide more accurate control.

Still another object of my invention is to provide an improved readily adjustable photoelectric sending unit of round configuration having a light condensing lens with respect to which a light source may be adjusted longitudinally to permit accurate adjustment of the light emanating from the unit.

Still a further object of my invention resides in the positioning of a light in a round bar of stock having an aperture for the reception of a condensing lens, the light source being adjustable longitudinally relative to the lens, and the round bar of stock being adjustable rotationally and longitudinally relative to a light receiving unit.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
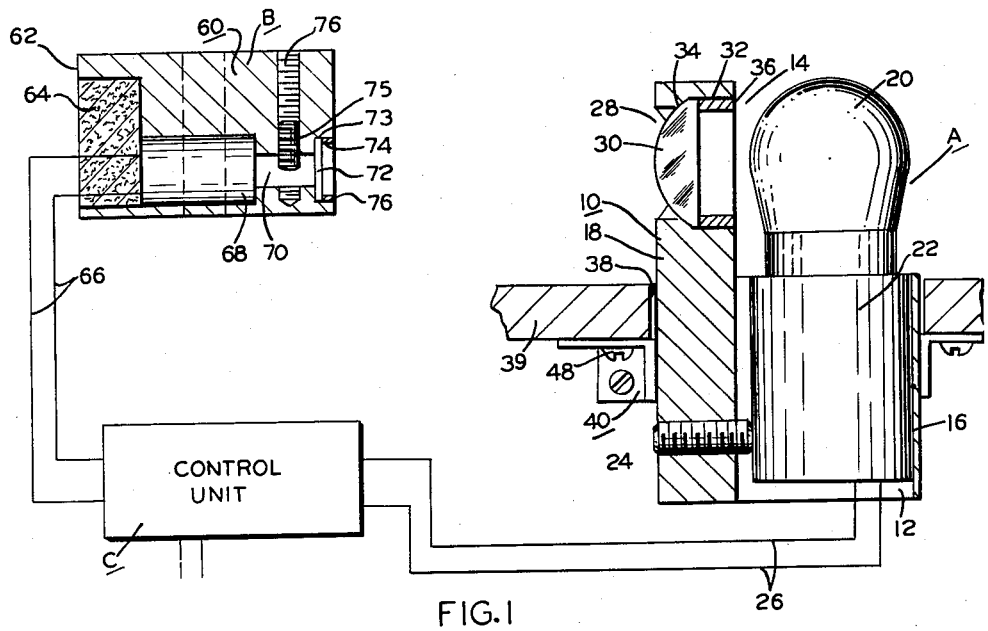
Figure 1 is a diagrammatic view, partly in section illustrating one desirable form of my invention.

Referring now more particularly to Fig. 1, it will be noted that a light source unit A is provided for directing a concentrated beam of light to a light receiving unit B operably connected to a control unit C which supplies current to the light source A, and controls suitable electrical circuits for operating devices to be controlled.

Figure 2:
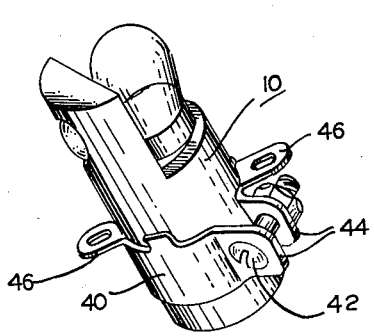
Fig. 2 is a perspective view of the sending unit illustrated in Fig. 1.

As shown more fully in Figs. 1 and 2, it will be noted that a round bar of stock 10 is provided with eccentric bore 12. The upper end of the bar 10 is relieved as shown at 14 adjacent the thin wall 16 defined by the eccentric bore 12, leaving the thick wall 18 uninterrupted. The cutaway section 14 provides a space for the ready reception of a light bulb 20 adapted to be secured in a cylindrical casing 22 adapted to be clamped in the eccentric bore 12 as by a set screw 24 threaded preferably through the thick wall 18 of the bar 10 and having a pointed end to engage the side wall of the cylindrical casing 22 and urge it into clamping engagement with the bar 10.

Electric current to illuminate the bulb 20 may be supplied through wires 26 from the control unit C.

The thick wall 18 of the round bar 10 is provided with a radially extended aperture 28 for the reception of a condensing lens 30 aligned with the light bulb 20. It will be noted that the lens 30 is preferably projected into the aperture 28 from the inside, an aperture of enlarged diameter 32 being aligned with the aperture 28 to provide a shoulder 34 to receive the peripheral edge of the lens 30. A clamping ring 36, preferably formed of the same material as is the bar 10 is press fitted within the enlarged diameter section 32 to engage the inner peripheral edge of the lens 30 to hold it in clamped engagement within the aperture 28. The bar 10 of the light source unit A is mounted in an aperture 38 of a horizontal platform or countertop 39. A bracket 40 shown in perspective in Fig. 2 encircles the bar 10 and is clampingly engaged thereto by means of a screw 42 engaging the ears 44. The angular and longitudinal position of the lens 30 of the bar 10 may thus be varied with reference to the platform or countertop 39. The bracket 40 encircling the bar 10 has outwardly flaring tabs 46 apertured to receive screws 48 by means of which the bracket 40 may be clamped to the lower surface of the platform or countertop 39 to position the light 20 and lens 30 above the upper surface of the platform and in alignment with the receiving unit B.

It will be noted that the position of the light bulb 20 and casing 22 relative to the condensing lens 30 may be adjusted longitudinally by merely loosening the set screw 24 and shifting the bulb and casing assembly axially in the eccentric bore 12 of the bar member 10 and then retightening the set screw 24. The entire light source unit A may be adjustable rotationally and longitudinally relative to the receiving unit B by loosening the screw 42 and oscillating the round bar 10 within the bracket 40 to a desired angularly adjusted position and shifting the bar 10 axially within the bracket 40 whereupon the screw 42 is tightened to securely clamp the bar unit 10 in a desired adjusted position relative to the bracket 40 and countertop 39.

The light receiving unit B consists of a block of metal or plastic 60 having in its rear face 62 an enlarged opening for the reception of light-sensitive material 64 connected through suitable electrical wires 66 with the control unit C which in turn is connected electrically with a device to be actuated such as a switch or other control mechanism. The block 60 is preferably formed with a bore 68 of intermediate diameter between the light-sensitive material 64 and a forward bore 70 of smaller diameter aligned with the lens 30 to receive light rays from the light source unit A and to interrupt the passage of stray light beams to the light-sensitive material 64. A window 72 is preferably secured in an enlarged section 73 aligned with the small diameter bore 70 to prevent the entry of dirt or other foreign matter, the window 72 preferably being held in place by a clamping ring 74.

The intensity of light passing through the bore 70 and impinging on the light-sensitive material 64 may be adjusted by the use of a set screw 75 threaded into a bore 76 positioned to intersect the bore 70. By varying the position of the forward end of the set screw 75 relative to the bore 70, the intensity of light directed from the light source 20 and impinging on the light-sensitive material 64 may be adjusted to provide desired operating characteristics.

Figures 3, 4, 5:
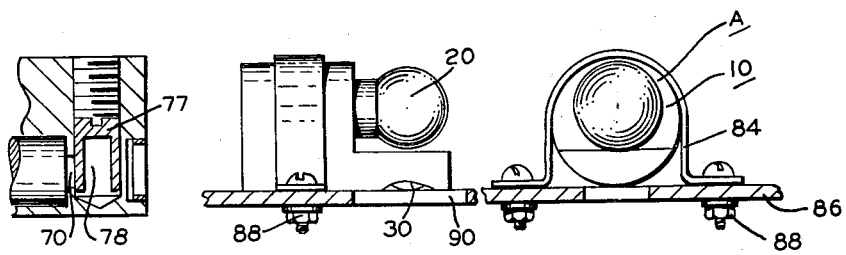
Fig. 3 is a fragmentary view of a portion of the receiving unit showing a modified form of control unit for adjusting the intensity of light.
Fig. 4 is a side elevational view of a modified form of clamping arrangement.
Fig. 5 is an end elevational view of the embodiment illustrated in Fig. 4.

Fig. 3 illustrates a modified form of light intensity control. It will be noted that a screw 77 having a slot 78 in its forward end substantially corresponding with the width of the bore 70 is provided to overlap the bore 70 as illustrated. The screw 77 may be oscillated slightly to vary the degree of interruption of the light beam flowing through the bore 70. It will be noted that very sensitive adjustment of the light intensity reaching the light-sensitive material may thus be provided since a 90° oscillation of the screw 77 will move the slot 78 from an unobstructing position in alignment with the bore 70 where no light obstruction is encountered to an obstructing position where the bore 70 is completely closed. Any desired intensity of light may thus be directed to impinge on the light-sensitive material 64 to effect the desired operation of devices connected thereto through the control unit C.

Figs. 4 and 5 illustrate a modified form of my invention wherein a U-shaped clamp 84 is provided to encircle the bar 10 to secure it to a support 86. The support 86 may extend horizontally or vertically, and bolts 88 may be employed to secure the clamp 84 to the support 86 to hold the light source unit A in any axial and rotational adjusted position to which it is moved. It will be noted that the lens 30 is aligned with an aperture 90 in the support 86.

Figure 6:
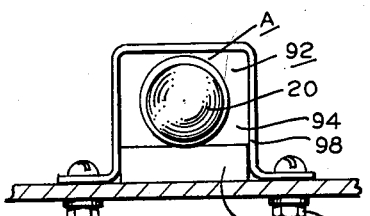
Fig. 6 is an end elevational view of a still further modified form of my invention.

The embodiment illustrated in Fig. 6 is generally similar to that illustrated in Figs. 4 and 5, it being noted that the light bulb 20 and its supporting socket are formed in a member 92 of generally square configuration. The end of the member 92 is cut away as illustrated at 94 to provide an axially extending section 96 for the reception of the condensing lens with which the light bulb 20 is aligned. This embodiment of the invention is designed primarily for use where the light source and light receiving units are secured in members which extend accurately in parallelism relative to each other, the generally U-shaped clamp 98 being loosened by manipulation of the bolts 88 to permit movement of the member 92 longitudinally of the clamp 98 to obtain desired alignment with the light receiving unit B.

While my invention has been illustrated as embodied in several forms, it will be understood that many changes will be made therein without departing from the spirit of my invention as defined by the following claims.

I claim:

1. In a photoelectric control unit a light source, a light receiving unit, a control unit operably connected to the light source and to the light receiving unit, the light source comprising a round bar having an eccentric bore, a casing adjustably mounted in the bore and having a light bulb socket, a light bulb in the socket, a condensing lens carried by the bar in alignment with the light bulb, and a bracket clampingly engaging the bar for rotational and longitudinal adjustment of the bar along its longitudinal axis relative to the light receiving unit.

2. The combination with the light source unit and a control unit of a photoelectric control device, of a light receiving unit comprising a member having a multi-diametered interconnected bore and having front and rear walls, a window secured in the front wall in alignment with the light source unit, light-sensitive material in the largest bore section, electrical connecting means between the light-sensitive material and the control unit and between the control unit and the light source unit, and a threaded adjustable screw projecting into the smallest of the multi-diametered bore to adjust the intensity of light impinging on the light-sensitive material.

3. A light receiving unit for a photoelectric control device comprising a member having a multi-diametered interconnected bore and having a front wall, a window secured in the front wall in alignment with said bore and aligned with a light source unit, light-sensitive material in the largest bore section, a threaded screw adapted to project into the bore to progressively throttle the internal diameter of said bore to adjust the intensity of light flowing to the light-sensitive material, and electrical connecting means between the light-sensitive material and the control unit and between a control unit and the light source unit.

4. A photoelectric control unit comprising a photoelectric cell, a light source positioned to impinge a beam of light on the cell, and a control unit operably connected between the cell and the light source; said light source including a generally cylindrical holder, a wall extending longitudinally outwardly from one end of the holder, an aperture in the wall, a condensing lens provided in the aperture, a longitudinal bore in the holder offset from the wall, a casing having a light bulb socket mounted in the bore for longitudinal adjustment, a light bulb in the socket, said light bulb being in alignment with the condensing lens, and a bracket detachably engaging the holder to permit adjustment of the holder along its longitudinal axis, whereby the light bulb may be adjusted longitudinally with respect to the lens and the lens and light bulb may be adjusted as a unit longitudinally with respect to the photoelectric cell.

5. A device as claimed in claim 4 and further characterized in that the photoelectric cell comprises a member having a multi-diametered bore therethrough, the first section of said bore having the smallest diameter and being in alignment with the beam of light from the light source, a second section of said bore of enlarged diameter immediately adjacent the first section, a third section of said bore immediately adjacent the second section and containing a light-sensitive material, and threaded screw means adjustably projecting into the first bore section to adjust the amount of light transmitted through the second bore section and impinged on the light-sensitive material.

6. A light source unit for a photoelectric control device comprising a generally cylindrical holder, a wall extending longitudinally outwardly from one end of the holder, an aperture in the wall, a condensing lens provided in the aperture, a longitudinal bore in the holder offset from the wall, a casing having a light bulb socket mounted in the bore for longitudinal adjustment, a light bulb in the socket, said light bulb being in alignment with the condensing lens, a flat surface having an aperture therein for supporting the holder, a bracket encircling the holder and secured to the surface with said condensing lens in alignment with said aperture in the surface, said bracket clampingly engaging said holder for longitudinal and rotative adjustment of the holder with respect to a light receiving unit.

7. A device as claimed in claim 3 and further characterized in that the threaded screw has a diameter substantially equal to the diameter of the bore into which it projects; a diametrically extending slot on the end of the screw extending into the bore to permit the passage of light thereby; rotation of the screw being effective to rotate the slot to a selected position to adjust the intensity of light impinging on the light-sensitive material.

References Cited in the file of this patent

UNITED STATES PATENTS

| | | |
|---|---|---|
| 1,946,681 | Frappier et al. | Feb. 13, 1934 |
| 2,069,597 | Wilson | Feb. 2, 1937 |
| 2,181,778 | Ball | Nov. 28, 1939 |
| 2,293,425 | Dammond | Aug. 18, 1942 |
| 2,407,580 | Scott | Sept. 10, 1946 |
| 2,453,693 | Armstrong et al. | Nov. 16, 1948 |
| 2,625,658 | Robinson | Jan. 13, 1953 |
| 2,688,099 | Bickley | Aug. 31, 1954 |
| 2,712,611 | Nyman | July 5, 1955 |
| 2,716,193 | Riolo | Aug. 23, 1955 |
| 2,839,646 | Hester | June 17, 1958 |
| 2,890,351 | Tongret | June 9, 1959 |